United States Patent [19]
Kim

[11] Patent Number: 5,438,425
[45] Date of Patent: Aug. 1, 1995

[54] FREQUENCY DROP OUT DETECTOR CIRCUIT AND METHOD THEREOF

[75] Inventor: Cheon-seob Kim, Suwon, Rep. of Korea

[73] Assignee: Samsung Electronics Co., Ltd., Kyungki-do, Rep. of Korea

[21] Appl. No.: 138,183

[22] Filed: Oct. 20, 1993

[30] Foreign Application Priority Data

Oct. 22, 1992 [KR] Rep. of Korea .......... 92-19425

[51] Int. Cl.$^6$ .......... H04N 5/94; H04N 5/945
[52] U.S. Cl. .......... 358/336; 358/314; 358/342; 360/38.1; 348/616
[58] Field of Search .......... 358/336, 314, 335, 310, 358/342; 360/38.1, 33.1; 348/616, 617; H04N 5/76, 5/94, 5/945, 9/88

[56] References Cited

U.S. PATENT DOCUMENTS

| | | | |
|---|---|---|---|
| 3,949,416 | 4/1976 | Stalley et al. | 360/38.1 |
| 4,644,415 | 2/1987 | Serizawa et al. | 358/314 |
| 4,893,192 | 1/1989 | Takemura | 358/336 |
| 5,050,002 | 9/1991 | Suzuki et al. | 358/336 |

*Primary Examiner*—Tommy P. Chin
*Assistant Examiner*—Khoi Truong
*Attorney, Agent, or Firm*—Sughrue, Mion, Zinn, Macpeak & Seas

[57] ABSTRACT

A frequency drop out compensating circuit and method thereof is applicable to the signals of both NTSC and PAL systems. The frequency drop out compensating circuit for NTSC/PAL systems in an optical disk system including an amplifier for amplifying an applied FM signal, a pulse generator for converting the frequency drop out signal detected from the amplified FM signal into a pulse signal and a drop out compensator for compensating the drop out when a frequency drop for the signal generated from the pulse generator is generated, has an integrator for integrating the FM signal generated from the amplifier and an integrating current controller for controlling the integrating current of the integrator according to the applied FM signal. Therefore, drop out can be detected and compensated in signals for both NTSC and PAL systems, by controlling the integrating current in consideration of the FM band utilized.

4 Claims, 2 Drawing Sheets

FREQUENCY DROP OUT DETECTOR CIRCUIT AND METHOD THEREOF

BACKGROUND OF THE INVENTION

The present invention relates to a frequency drop out compensating circuit and method thereof in an optical disk system, and more particularly to a frequency drop out compensating circuit and method thereof which can be applied to the signals of both NTSC (National Television System Committee) and PAL (Phase Alternation by Line) systems.

In general, an optical disk system such as a laser disk has been well regarded as an apparatus for recording large quantities of information due to many advantages. The optical disk system enables audio and video signals to be recorded at a high density and then reproduced, while exhibiting a much better random access function than other recording systems for audio/video data. Also, due to the use of a reflected laser beam for reading the signal to be reproduced, neither the disk nor pickup head becomes worn because they have no contact with each other.

However, such a laser disk system has a disadvantage in that signal errors or a temporary fall in output level may occur due to minor defects, dust or bugs in the recording medium, i.e., the optical disk.

Therefore, the optical disk system adopts one of two methods for the compensation of drop out. There are an amplitude drop out compensating method and a frequency drop out compensating method. The amplitude drop out compensating method is mainly to compensate an abrupt decrease of the level of an input FM signal due to the imperfections in the reproduced signal caused by damage to the disk or by a bug in the system. The frequency drop out compensating method compensates for deviation in the frequency of an input FM signal due to the partial loss of data by disk corrosion or a disk defect, which is generated during manufacturing.

The frequency drop out compensating method is not compatible with the different types of broadcasting systems and therefore different compensating circuits are used depending on the television broadcasting systems used. For example, the frequency drop out compensating circuit used for NTSC systems can compensate for frequency drop out in the NTSC system but cannot compensate for frequency drop out in other broadcasting systems.

Therefore, for an optical disk system which is used with both NTSC and PAL systems, separate frequency drop out compensating circuits (one for NTSC and one for PAL) have had to be provided and selectively switched into use. Thus, the circuit-configuration is more complex and the cost is higher.

SUMMARY OF THE INVENTION

In order to solve the above problems, it is an object of the present invention to provide a frequency drop out compensating method for use with both NTSC and PAL systems for detecting and compensating frequency drop out by varying the detecting reference frequency according to the change of an integrating current depending on an NTSC/PAL system.

Another object of the present invention is to provide a frequency drop out compensating circuit for use with both NTSC and PAL systems, which is most appropriate in performing the above frequency drop out compensating method.

To accomplish the first object of the present invention, a frequency drop out compensating method in an optical disk system comprises the steps of: determining whether an applied FM signal is a signal by an NTSC system or one by a PAL system; and controlling integrating current to integrate the applied FM signal to be supplied variably, in accordance with the adopted system determined by the determining step.

To accomplish the second object of the present invention, there is provided a frequency drop out compensating circuit having amplifying means for amplifying an applied FM signal, pulse generating means for convening a frequency drop out signal detected from the amplified FM signal into a pulse signal and drop out compensating means for compensating a drop out when a frequency drop out for the signal generated from the pulse generating means is generated, the circuit further comprising: integrating means for integrating the FM signal generated from the amplifying means; and integrating current controlling means for controlling integrating current to integrate the applied FM signal to be supplied variably, in accordance with the adopted system, in the integrating means.

BRIEF DESCRIPTION OF THE DRAWINGS

The above objects and other advantages of the present invention will be understood with reference to the following description of a preferred embodiment thereof with reference to the attached drawings in which.

DETAILED DESCRIPTION OF THE INVENTION

Referring to the accompanying drawings, the operation of the present invention will be described in detail.

Figure 1:
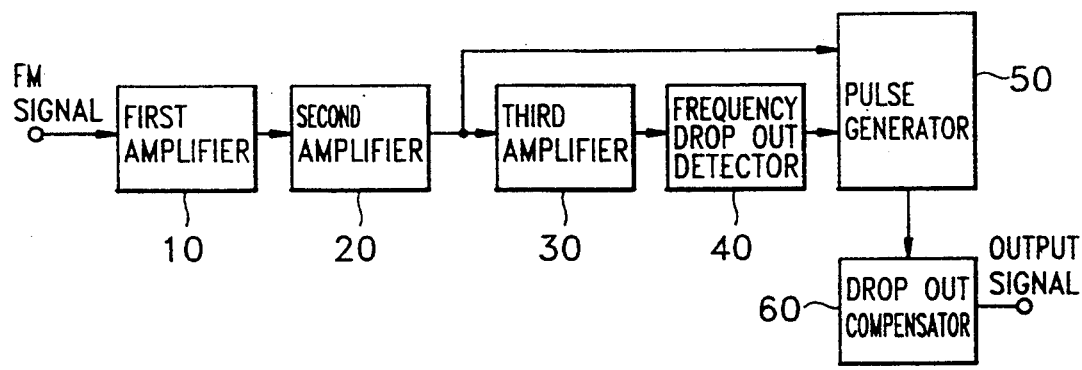
FIG. 1 is a block diagram of a frequency drop out compensating circuit according to the present invention.

FIG. 1 is a block diagram of a frequency drop out compensating circuit according to the present invention. The circuit of FIG. 1 includes first, second and third amplifiers 10, 20 and 30 for amplifying an applied FM signal, a frequency drop out detector 40 for detecting the frequency drop out from the signal generated from third amplifier 30, a pulse generator 50 for generating a corresponding pulse by receiving the signals generated from frequency drop out detector 40 and second amplifier 20, and a drop out compensator 60 for substituting a 1H prior signal for the original signal in the case of a frequency drop out occurring in the signal generated from pulse generator 50.

Figure 2:
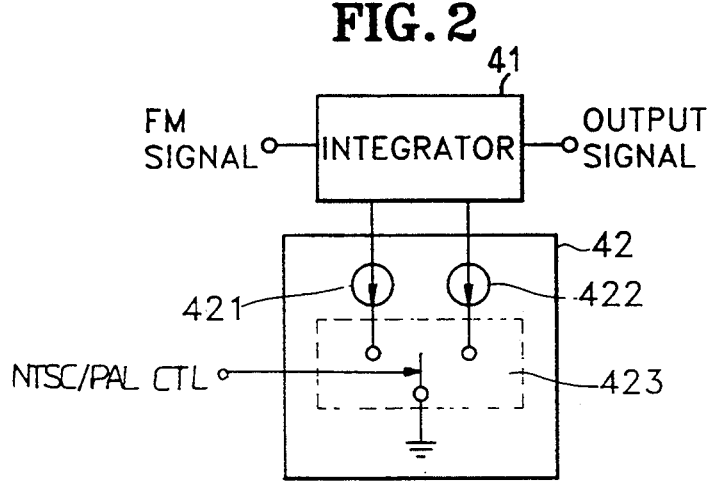
FIG. 2 is a schematic diagram of the frequency drop out detector shown in FIG. 1.

FIG. 2 is a schematic diagram of the frequency drop out detector 40 shown in FIG. 1. The frequency drop out detector 40 includes an integrator 41 for integrating the signal generated from third amplifier 30 and an integrating current controller 42 for controlling the integrating current of the integrator 41 in accordance with an NTSC or PAL system.

The integrating current controller 42 has a current source 421 for supplying the integrating current of integrator 41 to the signal of an NTSC system, a current source 422 for supplying the integrating current of integrator 41 to the signal of a PAL system, and a switch 423 for switching current sources 421 and 422.

Figure 3:
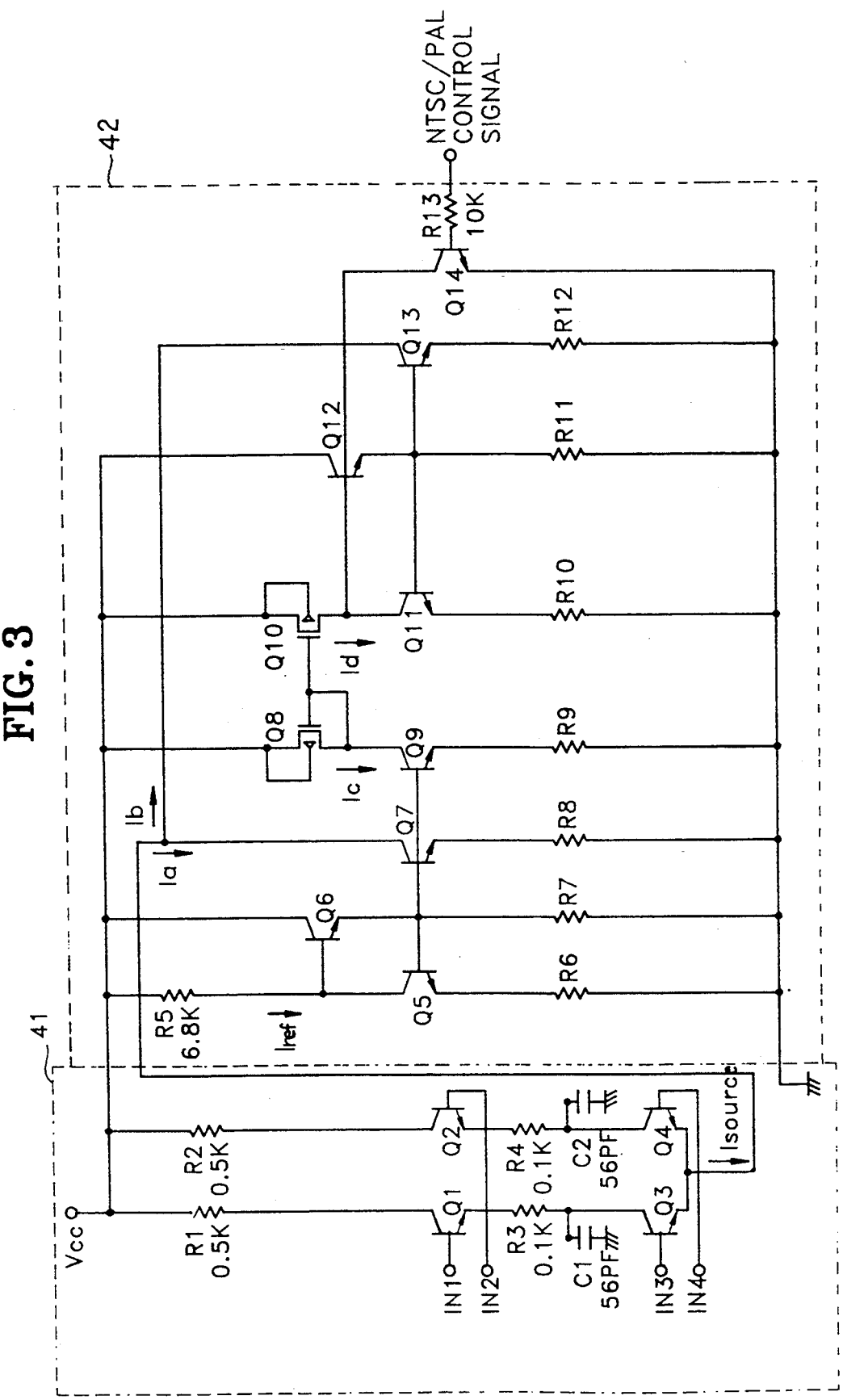
FIG. 3 is a detailed circuit diagram showing the frequency drop out detector of FIG. 1.

In FIG. 3, which is a detailed circuit diagram showing the frequency drop out detector shown in FIG. 1, integrator 41 comprises a first transistor Q1 whose base is connected with a first input terminal IN1 and whose collector is connected with the Vcc terminal through resistor R1, a second transistor Q2 whose base is connected with a second input terminal IN2 and whose collector is connected with the Vcc terminal through resistor R2, a third transistor Q3 whose base is connected with a third input terminal IN3 and whose collector is connected with the emitter of first transistor Q1 through resistor R3, a fourth transistor Q4 whose base is connected with a fourth input terminal IN4, whose collector terminal is connected with the emitter of second transistor Q2 through resistor R4, and whose emitter is connected with the emitter of third transistor Q3, a capacitor C1 connected between the collector of third transistor Q3 and ground, and a capacitor C2 connected between the collector of fourth transistor Q4 and ground.

Integrating current controller 42 comprises a fifth transistor Q5 whose base is connected with the base of a seventh transistor Q7, whose collector is connected with the Vcc terminal through resistor R5, and whose emitter is grounded through resistor R6, a sixth transistor Q6 whose base is connected with the collector of fifth transistor Q5, whose collector is tied to the Vcc terminal, and whose emitter is connected with the base of fifth transistor Q5, a seventh transistor Q7 whose base is grounded through resistor R7, whose collector is connected with the emitter of fourth transistor Q4, and whose emitter is grounded through resistor R8, an eighth PMOS transistor Q8 whose source is common with the substrate and connected with the Vcc terminal and whose gate is tied to its drain, a ninth transistor Q9 whose base is connected with the base of seventh transistor Q7, whose collector is connected with the drain of eighth PMOS transistor Q8, and whose emitter is grounded through resistor R9, a tenth PMOS transistor Q10 whose source is common with the substrate and connected with the Vcc terminal and whose gate is connected with gate of eighth PMOS transistor Q8, an eleventh transistor Q11 whose base is grounded through resistor R11, whose collector is connected with the drain of tenth PMOS transistor Q10, and whose emitter is grounded through resistor R10, a twelfth transistor Q12 whose base is connected with the collector of eleventh transistor Q11, whose collector is tied to the Vcc terminal, and whose emitter is connected with base of eleventh transistor Q11, a thirteenth transistor Q13 whose base is connected with the emitter of twelfth transistor Q12, whose collector is connected with the collector of seventh transistor Q7, and whose emitter is grounded through resistor R12, and a fourteenth transistor Q14 whose base is connected with an NTSC/PAL control signal input terminal through resistor R13, whose collector is connected with the base of twelfth transistor Q12, and whose emitter is grounded.

Figure 4A:
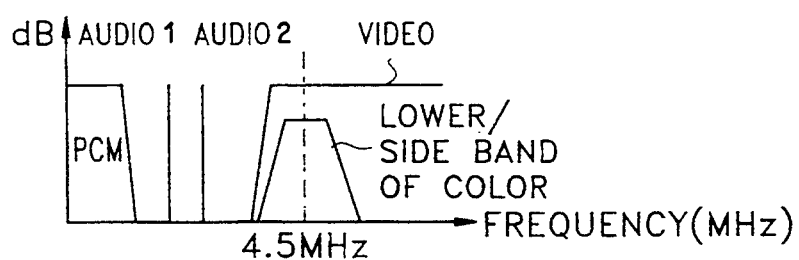
FIGS. 4A and 4B are waveform diagrams for comparing the FM bands of the NTSC and PAL systems.
Figure 4B:
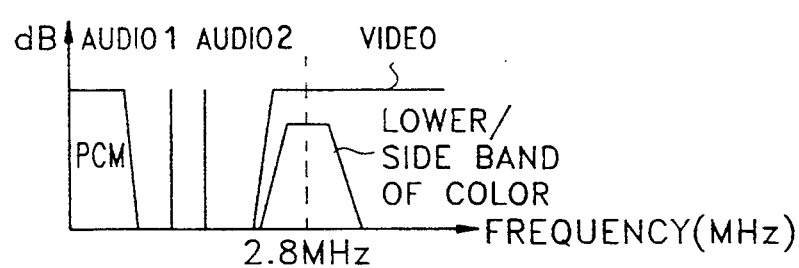

In FIGS. 4A and 4B, which are waveform diagrams for comparing the bands of an FM signal for an NTSC system and PAL system, respectively, the bands are divided into a band in which a digital audio signal is loaded as a pulse code modulation (PCM) signal, left and right analog audio signal bands and a video signal band. In FIG. 4A, which is a waveform diagram of the band of an FM signal for an NTSC system, an audio subcarrier is frequency-modulated to 2.3 MHz and 2.8 MHz in the audio signal band. The peak frequency of a white signal in the video signal band is modulated to 9.3 MHz, the blanking level is modulated to 8.1 MHz, and the sync tip level is modulated to 7.6 MHz. The mid-frequency of lower/side band of color is 4.5 MHz. In FIG. 4B, which is a waveform diagram of the band of an FM signal for a PAL system, an audio subcarrier is frequency-modulated to 0.673 MHz and 1.066 MHz in the audio signal band. The peak frequency of a white signal in the video signal band is modulated to 7.9 MHz, the blanking level is modulated to 7.1 MHz, and the sync tip level is modulated to 6.76 MHz. The mid-frequency of lower/side band of color is 2.8 MHz.

The operation of the present invention will be described in detail hereinafter by DC and AC interpretations of FIG. 3.

First, for DC interpretation, assume that R1, R2 and R6 are 0.5KΩ, R3 and R4 are 0.1KΩ, R5 is 6.8KΩ, R7 and R11 are 15KΩ, R8 is 1KΩ, R9, R10 and R12 are 1.5KΩ, R13 is 10KΩ, and C1 and C2 are 56 pF.

$$I_{ref} = \frac{V_{cc} - V_{BE}(Q6) - V_{BE}(Q5)}{R5 + R6} = \frac{(5 - 0.7) - 0.7}{6.8K + 0.5K} = 493 \ \mu A$$

$$I_a = I_{ref} \times \frac{R6}{R8} = 493 \ \mu A \times \frac{0.5K}{1K} = 247 \ \mu A$$

$$I_c = I_{ref} \times \frac{R6}{R9} = 493 \ \mu A \times \frac{0.5K}{1.5K} = 164 \ \mu A = I_d$$

Here, assume that if the signal applied via the NTSC/PAL control signal input terminal is a logic high, the applied FM signal is from a PAL system, and otherwise, the applied FM signal is from an NTSC system.

When the signal applied via the NTSC/PAL control signal input terminal is a logic low, that is, the applied FM signal is from an NTSC system, then the following currents are calculated thus:

$$I_b = I_d \times \frac{R10}{R12} = 164 \ \mu A \times \frac{1.5K}{1.5K} = 164 \ \mu A$$

When the signal applied from the NTSC/PAL control signal input terminal is a logic high, that is, the applied FM signal is from a PAL system, Q13 is off. Therefore, $$I_{source} = I_a = 247 \ \mu A$$

By AC interpretation, the operational principle of integrator 41 is as follows.

The signals of first input terminal IN1 and second input terminal IN2 are 180° out of phase. The signal supplied to the first input terminal IN1 is the same as that supplied to fourth input terminal IN4, while the signal supplied to the second input terminal IN2 is the same as that supplied to third input terminal IN3.

First, if a logic high is input to fourth input terminal IN4, fourth transistor Q4 turns on while third transistor Q3 turns off since a logic low is being input to third input terminal IN3. Accordingly, capacitor C1 is charged. At the same time, since a logic low is input to second input terminal IN2, second transistor Q2 turns off while first transistor Q1 turns on since a logic high is being input to first input terminal IN1 and, thus, capacitor C2 is discharged.

Conversely, if a logic low is input to fourth input terminal IN4, fourth transistor Q4 turns off while third transistor Q3 turns on since a logic high is being input to third input terminal IN3. Accordingly, capacitor C1 is discharged. At the same time, since a logic high is input to second input terminal IN2, second transistor Q2 turns on while first transistor Q1 turns off since a logic low is being input to first input terminal IN1 and, thus, capacitor C2 is charged.

The relationship between frequency and voltage swing width can be understood from the following equation:

$$dv = \frac{1}{C} \times \frac{I_{source}}{dt}$$

wherein capacitance value C is 56 pF.

As described in the above DC interpretation, when an NTSC signal is applied, 411 μA of $I_{source}$ current flows, and when a PAL signal is applied, the $I_{source}$ current flow is 247 μA. Table 1 shows the relationship between frequency and voltage swing width in accordance with the applied FM signal by NTSC or PAL system.

TABLE 1

|  | 2MHz | 3MHz | 4MHz | 5MHz | 6MHz |
| --- | --- | --- | --- | --- | --- |
| NTSC | 1.836V | 1.223V | 0.917V | 0.7339V | 0.6116V |
| PAL | 1.103V | 0.7351V | 0.5513V | 0.4411V | 0.3676V |

That is to say, since 0 V is applied to NTSC/PAL control signal input terminal when the input signal is an FM signal from an NTSC system, the current source 421 of integrator 41 ($I_{source}$) is 411 μA, which is the sum of $I_a$ and $I_b$. If the input signal is the FM signal of a PAL system, +5 V is applied to NTSC/PAL control signal input terminal. Therefore, the current source 422 of integrator 41 ($I_{source}$) is 247 μA, which is equal to the value of $I_a$.

Consequently, in integrator 41, which is composed of capacitors C1 and C2 and first to fourth transistors Q1–Q4, the voltage swing widths are determined by the frequency. The relationship between frequency and voltage swing width as shown in Table 1 is obtained by regulating the current from the current source, and the detected voltage swing value is set at about 0.8 V. The detected voltage swing value is set depending on the FM band of the video signal shown in FIG. 4. Therefore, a drop out can be detected at below 4.5 MHz and 2.8 MHz in the case of NTSC and PAL systems, respectively, as shown in Table 1.

As described above, the frequency drop out compensating circuit and method thereof for use with both NTSC and PAL systems according to the present invention has an advantage in that drop out for both NTSC and PAL signals can be detected and be compensated for below two predetermined frequencies by controlling the integrating current in consideration of the FM bands of the NTSC and PAL systems.

What is claimed is:

1. A frequency drop out detector for determining frequency drop out in both a PAL system and an NTSC system, comprising:

an integrator for integrating an FM signal applied thereto, said integrator having an input for receiving a source of integrating current;

a variable source of integrating current for selectively applying first and second integrating currents to said input of said integrator for controlling the rate of integration of said integrator, said selection being based on whether said FM signal is of an NTSC or a PAL system; and means for detecting the relationship between the integrated value of said FM signal and a fixed reference to determine the existence of drop out in said FM signal irrespective of whether said FM signal is of an NTSC or a PAL system.

2. The frequency drop out detector of claim 1, wherein said integrator comprises:

a pair of integrating capacitors;

electronic switching means responsive to said FM signal for alternately, at the frequency rate of said FM signal, connecting said capacitors to said source of integrating current.

3. The frequency drop out detector of claim 2, wherein said variable source of integrating current comprises a first current generator and a second current generator, and control circuit means responsive to a control input representing NTSC or PAL for combining said current generators to provide an output integrating current dependent upon whether said FM signal is of an NTSC or a PAL system.

4. In an optical disk system, a method of detecting frequency drop out in an applied FM signal irrespective of whether said FM signal is one from an NTSC system or a PAL system, the method comprising the steps of:

integrating said FM signal based on a source of integrating current;

selecting the value of said integrating current depending upon whether said FM signal is in an NTSC or a PAL system to thereby vary the rate of integration of said integration step; and detecting the integrated value of said FM signal to determine drop out based on a reference level of integrated values irrespective of whether said FM signal is in an NTSC or a PAL system.

* * * * *